United States Patent Office.

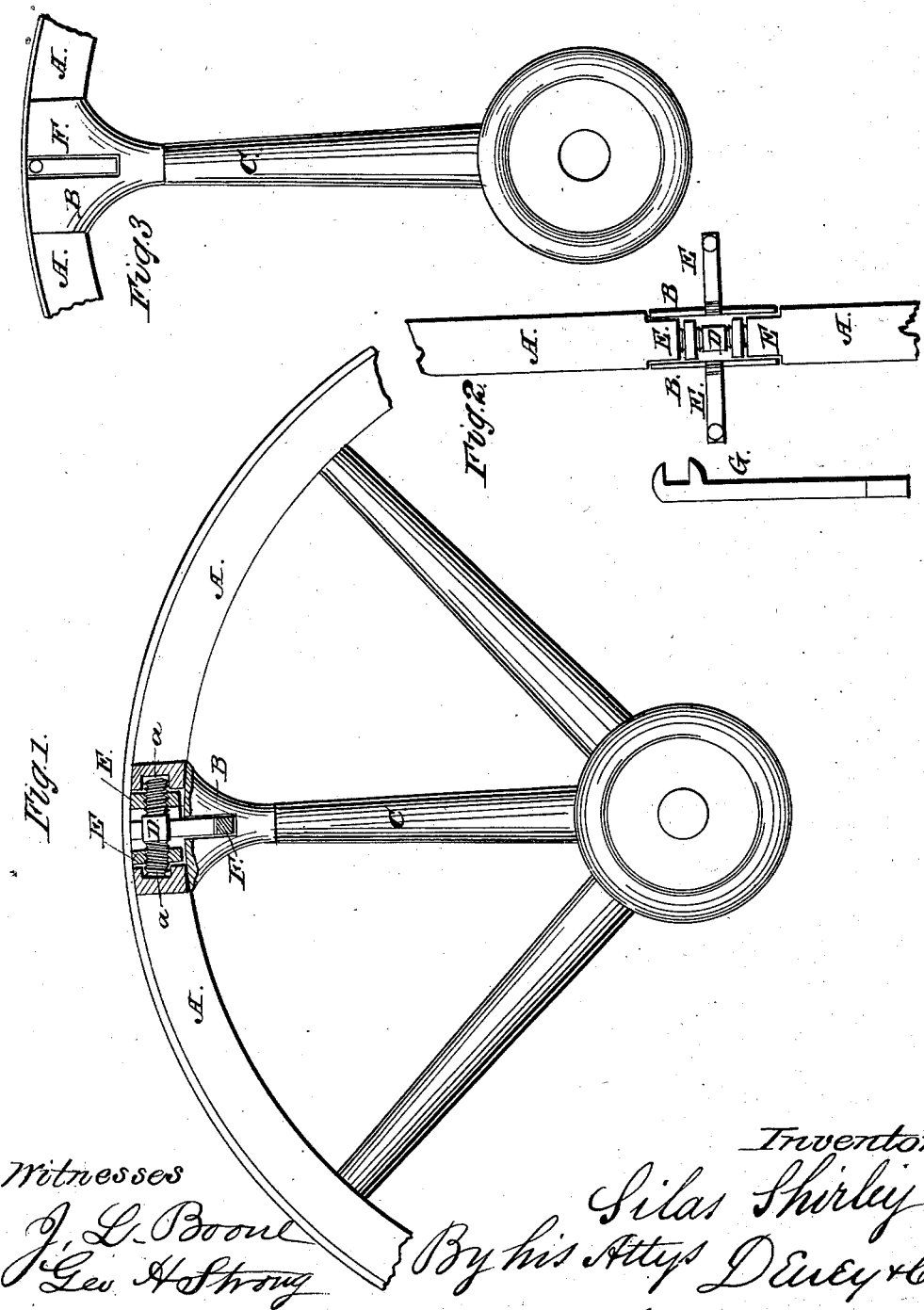

SILAS SHIRLEY, OF SANTA CLARA, CALIFORNIA.

Letters Patent No. 78,141, dated May 19, 1868.

IMPROVEMENT IN TIRE-TIGHTENER.

The Schedule referred to in these Letters Patent and making part of the same.

TO ALL WHOM IT MAY CONCERN:

Be it known that I, SILAS SHIRLEY, of the city and county of Santa Clara, State of California, have invented an Improved Device for Regulating the Set of Wagon-Tires; and I do hereby declare the following description and accompanying drawings are sufficient to enable any person skilled in the art or science to which it most nearly appertains to make and use my said invention or improvements without further invention or experiment.

My invention relates to an improved device for regulating the set of wagon-tires, so that they can be easily made to fit closely when the wheel becomes dry, or they may be slackened, if so tight as to warp and alter the shape of the wheel, the whole work being easily done by the teamster without either taking off or cutting the tire.

To more fully explain my invention, reference is had to the accompanying drawings, forming a part of this specification, of which—

Figure 1 is a side elevation of a portion of a wheel with my device attached.

Figure 2 is an edge view of the wheel, showing the covers open.

Figure 3 is a side elevation, showing the covers or caps closed.

Similar letters of reference in each of the figures indicate like parts.

A is the felloe of a wagon-wheel. Upon the end of one of the spokes C, I fasten a metal tip or hollow block, B, which is shaped so as to conform to the general outline of the parts, and not mar the symmetry of the wheel. This tip is sufficiently long, in the direction of the circumference of the wheel, to admit at each end the end of the felloes, where they are retained in a socket.

In the centre of the tip B is placed a screw, composed of the square central nut or head D, and the right and left screws $a\ a$. These screws pass respectively through the nuts E E, and by turning the screws the nuts are drawn towards one another, or spread apart, as desired. If drawn towards each other they simply allow the ends of the felloes to follow them, and thus contract the diameter of the wheel by the pressure of the tire; but if spread apart they force the ends of the felloes apart, and increase the diameter of the wheel, filling the tire so that it fits closely, this increase being distributed through the entire circumference of the wheel, although the force is applied at only one point.

F F are small covers or doors, which are kept closed when travelling by a screw, as shown in fig. 3. When it is necessary to change the set of the tire, these covers are opened, when the wrench G may be inserted and the tire set in a few moments, without recourse to a blacksmith. In this way the tire may be set, when on the road, or whenever it needs altering, and by any person who happens to be near.

Having thus described my invention, what I claim, and desire to secure by Letters Patent, is—

In the tip B, having sockets for the felloes, the covers F F, substantially as and for the purpose herein described.

In witness whereof, I have hereunto set my hand and seal.

SILAS SHIRLEY. [L. S.]

Witnesses:
C. W. M. SMITH,
J. L. BOONE.